United States Patent [19]
Capriotti et al.

[11] 4,103,903
[45] Aug. 1, 1978

[54] FLUID ACTUATED SEALING ARRANGEMENT

[75] Inventors: Alfred J. Capriotti, Falls Township, Bucks County; John Gana, Buckingham Borough; Thomas J. Korpela, Upper Merion Township, Montgomery County, all of Pa.

[73] Assignee: United States Steel Corporation, Pittsburgh, Pa.

[21] Appl. No.: 709,732

[22] Filed: Jul. 29, 1976

[51] Int. Cl.² .................. F16J 15/16; F16L 17/00
[52] U.S. Cl. .................. 277/27; 277/14 V; 308/187.1
[58] Field of Search .......... 308/187.1, 187, 36.3; 277/14 V, 14 R, 13, 83, 135, 34.3, 127, 27, DIG. 7; 266/245; 164/282; 184/1 R, 6.14, 6.27

[56] References Cited

U.S. PATENT DOCUMENTS

| | | | |
|---|---|---|---|
| 2,020,512 | 11/1935 | Mendenhall et al. | 277/14 V |
| 3,068,012 | 12/1962 | Van Fleet | 277/27 |
| 3,347,552 | 10/1967 | Frisch | 277/27 |
| 3,556,538 | 1/1971 | Muller | 277/27 |
| 3,746,328 | 7/1973 | Martt | 266/245 X |
| 3,908,746 | 9/1975 | Follrath et al. | 164/282 X |

Primary Examiner—David H. Brown
Attorney, Agent, or Firm—William A. Danchuk

[57] ABSTRACT

A fluid actuated sealing arrangement is provided for use in conjunction with a rotatable member. The arrangement utilizes an actuating fluid for both biasing a rotatable sealing element of the sealing arrangement into sealing association with a portion of the rotatable member and for providing the necessary lubrication to the rotatable sealing element. The sealing arrangement is configured to provide a loading force to the sealing element which is substantially parallel to the axis of rotation of the rotatable member. In a preferred embodiment of the arrangement, the sealing element is adapted to seal a surface substantially normal thereto which is formed as an extension of the rotatable element being sealed.

24 Claims, 7 Drawing Figures

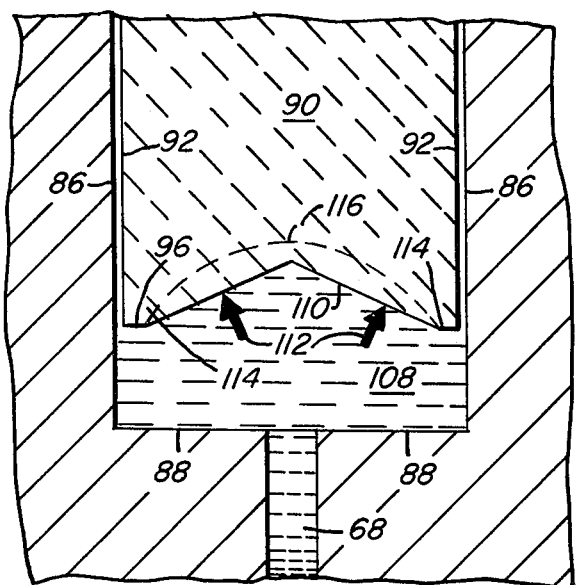
FIG. 4
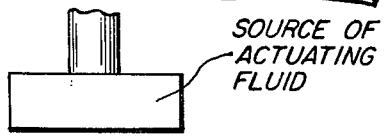
FIG. 5
FIG. 6
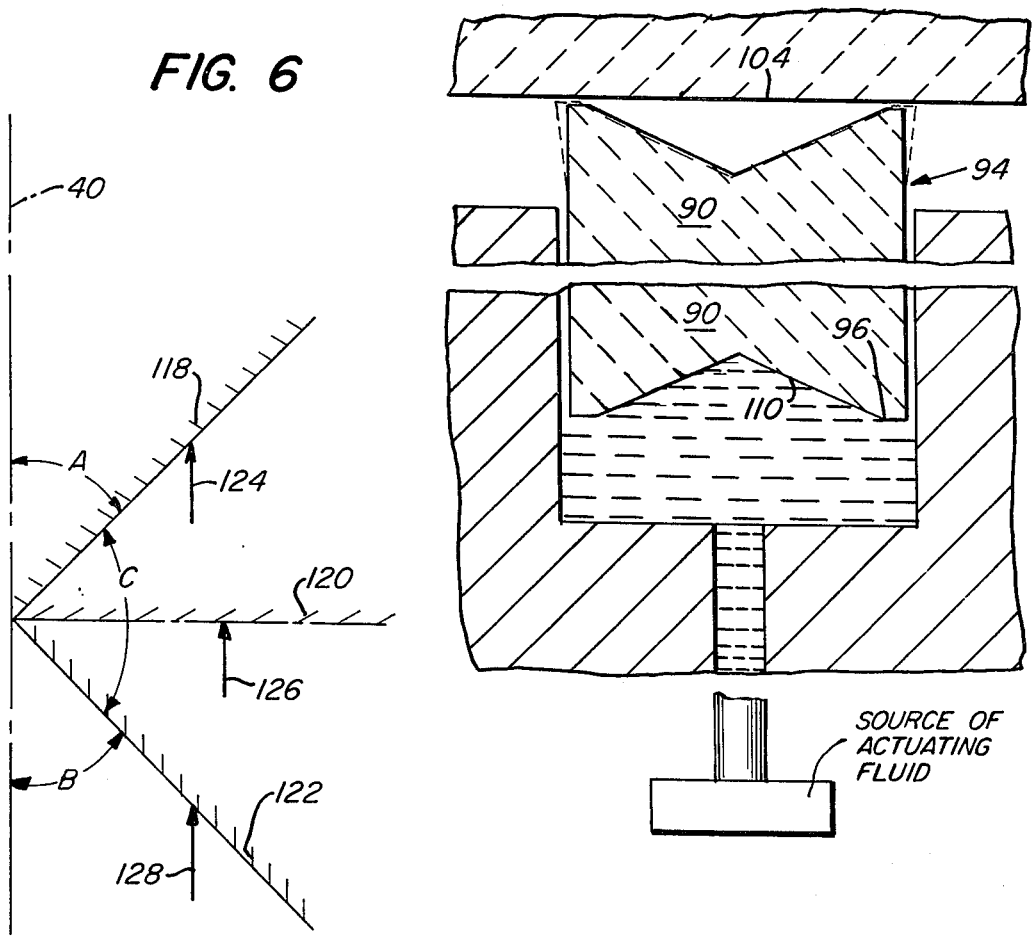

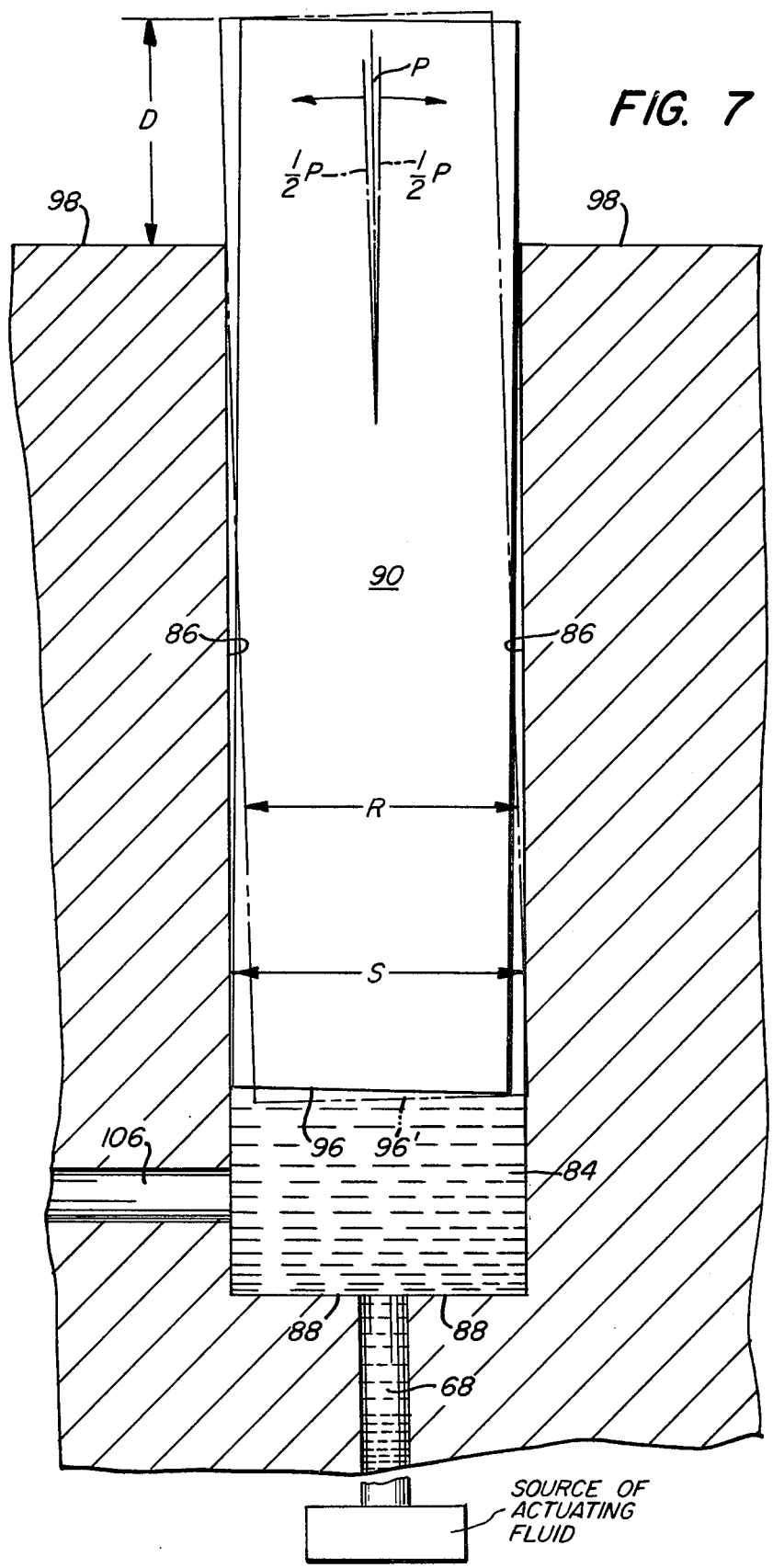

FLUID ACTUATED SEALING ARRANGEMENT

BACKGROUND OF THE INVENTION

The use of rollers within the multifaceted steel industry is not new. Rollers, for example, are employed for both containing the product, as is exemplified in the area of continuous casting, as well as re-sizing heated slab products into thinner and thinner sheets in a hot strip mill. In almost all cases, the rollers employed are usually of massive proportions with analogously sized bearings, housings and additional supportive components. The size of the rollers and their associated support elements dictate that their replacement and maintenance costs are also equally large.

In order to minimize costs associated with maintaining and rebuilding these elements, as well as the expense of downtime while no product may be produced, attempts have been made to provide efficient, inexpensive and easily maintained sealing arrangements for the roller assemblages. The success with which such attempts have met is dictated, in part, by the environment in which the rollers and their associated supportive elements operate. For instance, scale, dirt, heat and fillings constantly assault the rollers, bearings and seals, thereby making maintenance rather difficult. The matters of ubiquitous scale, dirt and heat are complicated by the deficiencies inherent in most of the sealing designs currently employed for protecting rollers, bearings and the like. Difficulties of seal failure were encountered with these designs following relatively short operating times. As the seals failed the contaminantes noted above were allowed to enter and attack the bearings which led to their subsequent failure. Once the bearings failed, the total roller assembly had to be replaced, thereby resulting in downtime for replacement and the added expense of rebuilding the bearing boxes and associated equipment. Such costs may only be fully appreciated when it is considered that the bearing boxes for most rollers applicants have been associated with are of a size not dissimilar to a small room. Accordingly, it was necessary and desirable to provide for a sealing arrangement which would efficiently seal the massive rollers in the seal degrading environment such elements are forced to operate.

SUMMARY OF THE INVENTION

The present invention is addressed to a fluid actuated sealing arrangement in which fluid is employed for both actuating a sealing element of the arrangement into sealing association with the surface to be sealed as well as for providing lubrication to the sealing element during the latter's operation within the arrangement. In a preferred embodiment of the present invention, the sealing arrangement is used in conjunction with a roller which is mounted for rotation upon a shaft or spindle. The roller is sealed along a portion of one of its sides which is oriented substantially normal to the axis of rotation of the roller and shaft. The arrangement is formed having a generally cylindrical housing which encircles the shaft and which is in relatively close proximity to the side of the roller which is to be sealed. Mounted within a circular slot formed in a portion of the housing closest to the roller side is a sealing ring which substantially fills the slot. Both the slot and the sealing ring are configured having parallel sides and ends which are prependicularly oriented thereto. The sealing ring is configured to move upwardly within the slot into engagement with the roller side to be sealed. Movement of the ring is effected by the pumping of an actuating fluid through a bore formed within the housing which terminates at the bottom of the slot. Consequently, by pressurizing the fluid there is realized movement of the ring within the slot. The tolerances provided between the ring and slot are such that some amount of askew movement of the sealing ring within the slot is tolerated without losing sealing pressure, the latter operation being useful to accommodate a certain minor degree of misalignment or wear of the roller side relative to the seal housing and sealing ring.

The sealing arrangement is further configured such that the sealing ring, rather than being statically held within its housing, is rotatable with the roller upon the cushion of fluid provided between it and the bottom of the slot which is formed as a sealing ring seat. As a result, there is substantially no wear between the sealing ring and roller. It should be noted in this regard that the same fluid employed for actuating the ring into sealing engagement with the roller also provides the necessary lubricating action to the slot and ring interface. In order to further insure proper fluid flow, which in the preferred embodiment is grease, bleed holes are provided within the housing to permit the exiting of a slight but constant amount of grease from the housing just below the sealing ring. In this manner, a constant fresh source of lubricant is provided which does not have sufficient time to harden or dry out in light of the harsh heat conditions to which the total assemblage is subjected.

Accordingly, it is a primary object and feature of the present invention to provide a simplified, uncomplicated and efficient sealing arrangement for a surface or portion thereof to be sealed.

It is a general object and feature of the present invention to provide a fluid actuated sealing arrangement for a surface to be sealed, the actuating fluid providing a lubrication effect to the sealing elements of the arrangement.

It is another object and feature of the present invention to provide a fluid actuated sealing arrangement for a rotataable member having at least a portion thereof which is oriented in a non-parallel direction to the axis of rotation of the rotatable member, the arrangement including a sealing element which is movable into sealing association with the non-parallel-oriented portion of the rotatable member by the actuating fluid, the sealing element being rotatable with the rotatable member upon the actuating fluid.

It is yet another object and feature of the present invention to provide a fluid actuated sealing arrangement for a rotatable member, the sealing arrangement being configured, in part, to accommodate for any minor amount of wobble of the rotatable member while retaining sealing engagement therewith.

Other objects and features of the invention will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the annexed claims. The invention itself, however, both as to its structure and its operation, together with the additional objects and advantages thereof, will best be understood from the following description of the preferred embodiment of the invention when read in conjunction with the accompanying drawings wherein:

FIG. 4 is a detailed lateral sectional view of one specific embodiment of the present sealing arrangement;

FIG. 5 is another detailed diagrammatical view of another embodiment of the present sealing arrangement;

FIG. 6 is a diagrammatical representation of the relationship of a sealing surface and the axis of rotation of an element with which the present invention is associated; and FIG. 7 is a detailed sectional view of one portion of the sealing arrangement of the present invention showing one object and advantage of the present sealing arrangement.

DETAILED DESCRIPTION OF THE INVENTION

Figure 1:
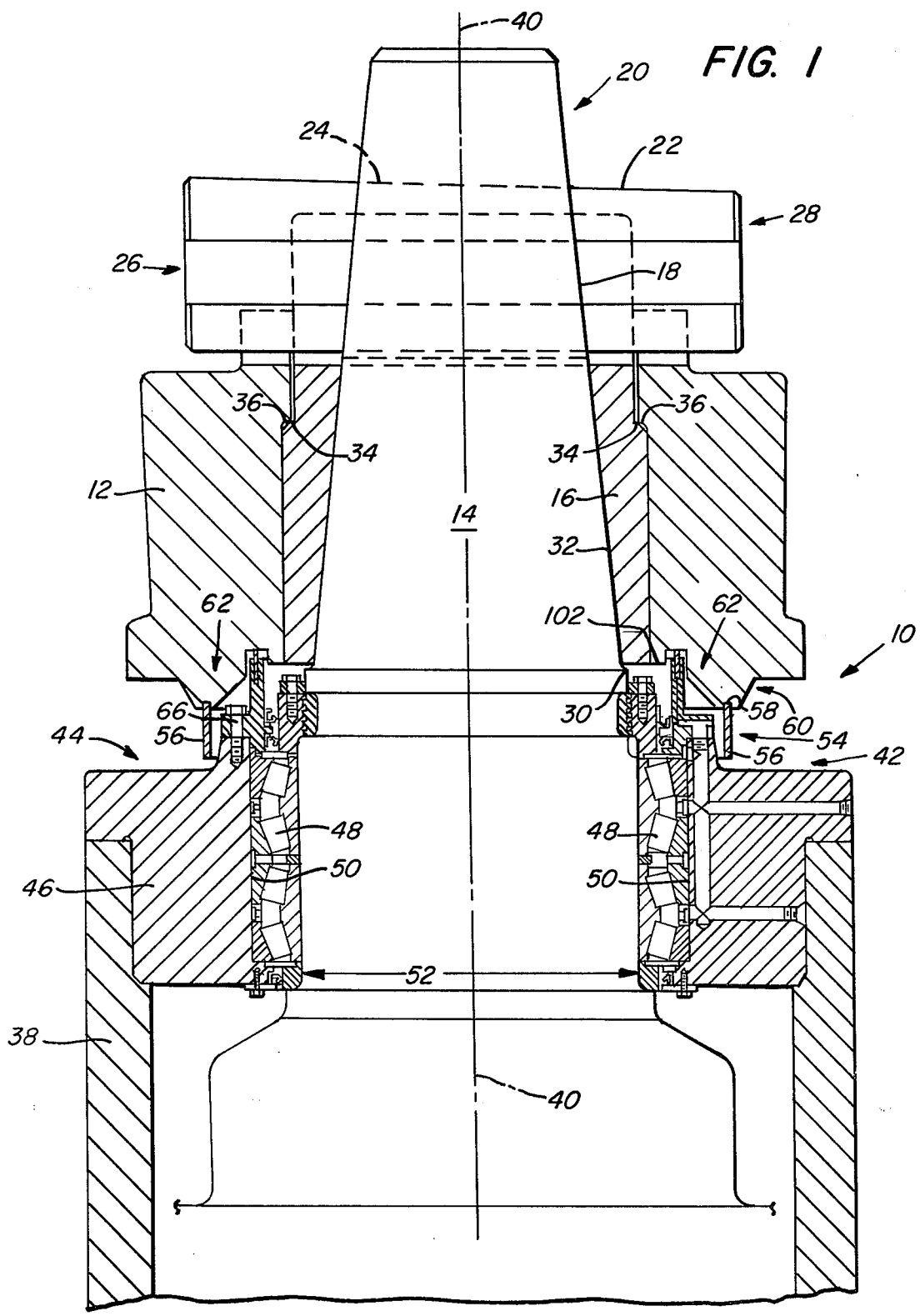
FIG. 1 is a side elevational view of a roller assemblage including the sealing arrangement of the present invention with certain portions sectioned to more clearly define internal detail.

An edge roller assemblage, employed for rolling the edge of large steel slabs, is shown in FIG. 1. Referring to FIG. 1, there is shown a lateral elevational view of a roller assemblage 10 with which the present invention is employed. The roller assemblage includes a roller 12 which makes direct contact with the product to be rolled. In the embodiment shown, the roller 12 is mounted upon a bull gear or large shaft/spindle 14 through a sleeve 16. The sleeve 16, as shown in FIG. 1, is employed for facilitating the removal of the roller 12 from the bull gear 14 for maintenance or replacement purposes. Additionally, as may be seen from FIG. 1, the bull gear 14 is configured having a tapered end portion 18. The sleeve 16 is configured to properly support the roller 12 for rotation upon the bull gear 14 in a specific manner which will be described in further detail below. Both the roller 12 and its associated sleeve 16 are retained upon bull gear 14 by a key and keyway arrangement shown generally at 20 proximate the end of bull gear 14. The key 22, in addition to having an inwardly notched cross-sectional stage, is tapered from one end 26 to its other end 28.

The manner in which the sleeve 16 is configured with respect to the bull gear 14 results in a limitation of the downward movement of the former relative to the latter. Specifically, a step or lip 30 is located at the bottom of the taper of gear 14. This step or lip 30, in combination with the inner taper 32 of sleeve 16 limits the downward movement of the sleeve upon the gear 14. In much the same manner, an outer lip 34, formed on the exterior portion of sleeve 16 is engaged by a step or notch 36 located on the interior of roller 12 for limiting the downward movement of the roller 12 relative to sleeve 16 and bull gear 14.

The bull gear 14, providing the necessary rotational forces for rotating the roller 12 and the associated sleeve 16, is mounted for rotation within the above-noted gear box, a portion of which is indicated at 38. The gear box includes the necessary bearings and gear drive components for channeling the drive source (not shown) to bull gear 14 and causing both it and roller 12 to rotate about an axis of rotation indicated at 40. The bull gear 14 is supported for rotation proximate its exit from the gear box at 42 by a bearing support assembly shown generally at 44. The assembly 44 is composed of a generally cylindrical bearing cartridge 46 and a set of tapered roller bearings 48 positioned and supported on the inward side 50 of cartridge 46. The bull gear 14 is passed through the aperture 52 formed between opposite sides of the tapered roller bearings 48.

The specific problem of contaminant infiltration into the bearings 48, resulting in their gradual degradation, occurs in the area 54 between the roller 12 and the upper part of the bearing cartridge 46. Scale, water, dirt and other bearing degrading contaminants pass through area 54 and eventually begin to attack the taper roller bearings 48. In order to alleviate some of this influx, a skirt 56 is provided extending downwardly from a slot 58 formed in the lower portion 60 of roller 12. However, due to the large amounts of these contaminating elements, the skirt is only partially successful in excluding such elements from the roller bearings. As a consequence, the sealing arrangement of the present invention, shown generally at 62, is provided in the area 54 between roller 12 and the top of bearing cartridge 46. A more detailed view of this sealing arrangement is shown in FIG. 2.

Figure 2:
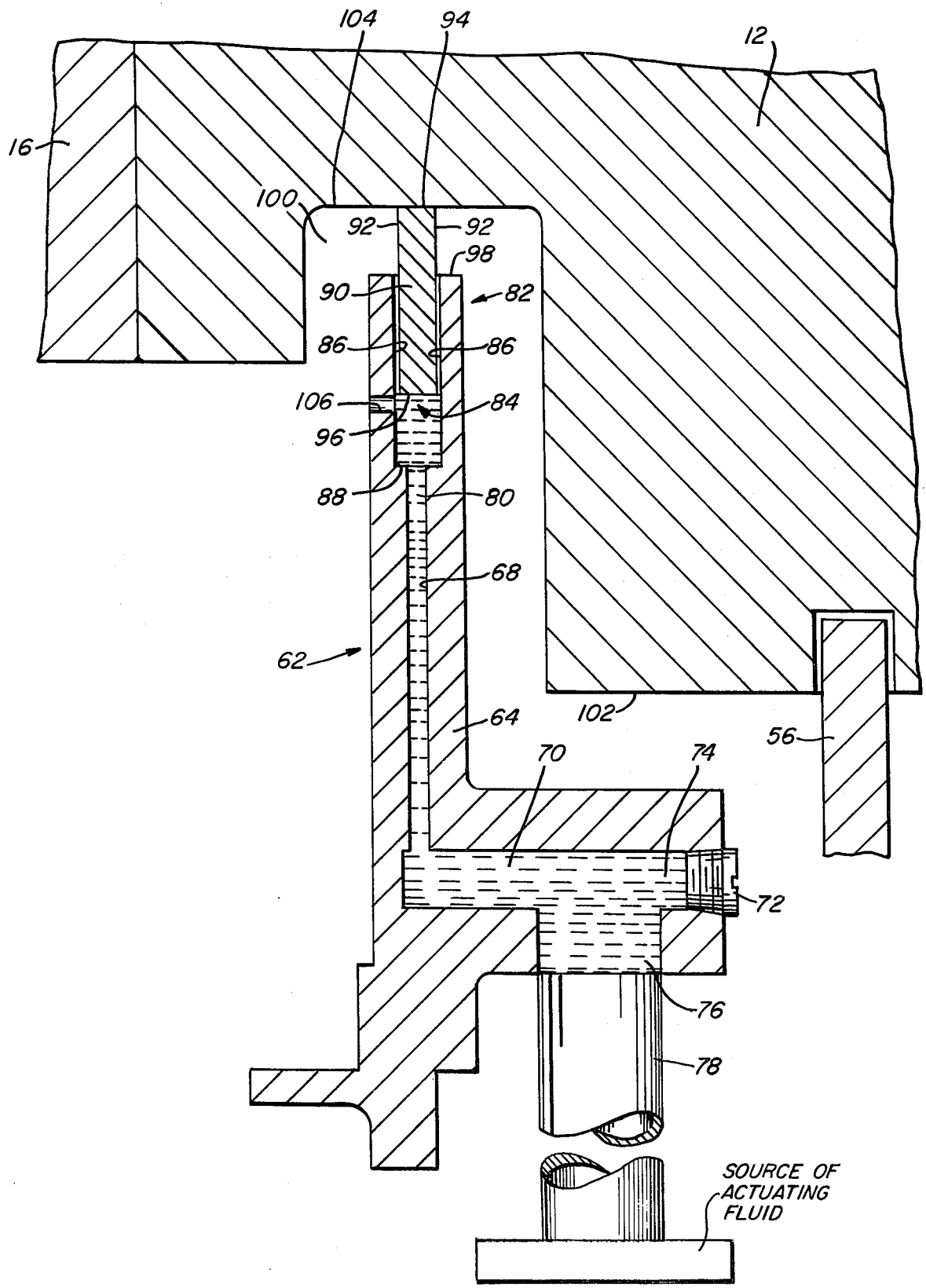
FIG. 2 is a sectional view of a portion of the sealing arrangement shown in FIG. 1 in one mode of operation.

Looking to FIG. 2, there is shown a portion of the structure of FIG. 1 with certain portions thereof being removed in order to more clearly point out the features of the present sealing arrangement. The sealing arrangement, denoted at 62, is configured having a generally cylindrically shaped housing 64 which surrounds the bull gear 14 (see FIG. 1). The housing 64 has an elongated shape and is mounted to the top of the bearing cartridge by bolts 66 which are periodically spaced about the circumference of the housing 64. Extending through the longitudinal dimension of the housing is a bore 68 which is connected, in turn, to a second and somewhat larger bore 70. Approximately four such bores are located about the periphery of the housing. A plug 72 is placed at the end 74 of bore 70 for reasons which will become more apparent as the present discussion proceeds. An aperture 76 provides, in conjunction with, in the preferred embodiment, a grease connection 78, a path by which grease may flow from its source, through the connection 78 to the top portion 80 of the longitudinal bore 68.

Cut into the upper portion 82 of the housing 64 is a slot 84 which extends completely around the entire circumference of the housing. Accordingly, the full circumferential slot 84 is connected to the grease source (not shown) by the four above-noted bores and apertures. The slot 84 is configured having substantially vertical and parallel side walls 86 and a bottom portion 88 oriented normally thereto and which forms a sealing seat for the sealing element of the arrangement. The side walls 86 are configured having parallel sides for reasons which will become apparent as the specification continues.

The slot 84, formed within the top of housing 64, is configured to receive a sealing element which, in the preferred embodiment of the invention, is configured as a Teflon ® (poly(tetrofluoroethylene)) sealing ring 90 complimentarily configured relative to the slot in which it operates. The sealing ring 90 is formed having substantially vertically oriented and parallel sides 92 and a top 94 and a bottom 96.

Figure 3:
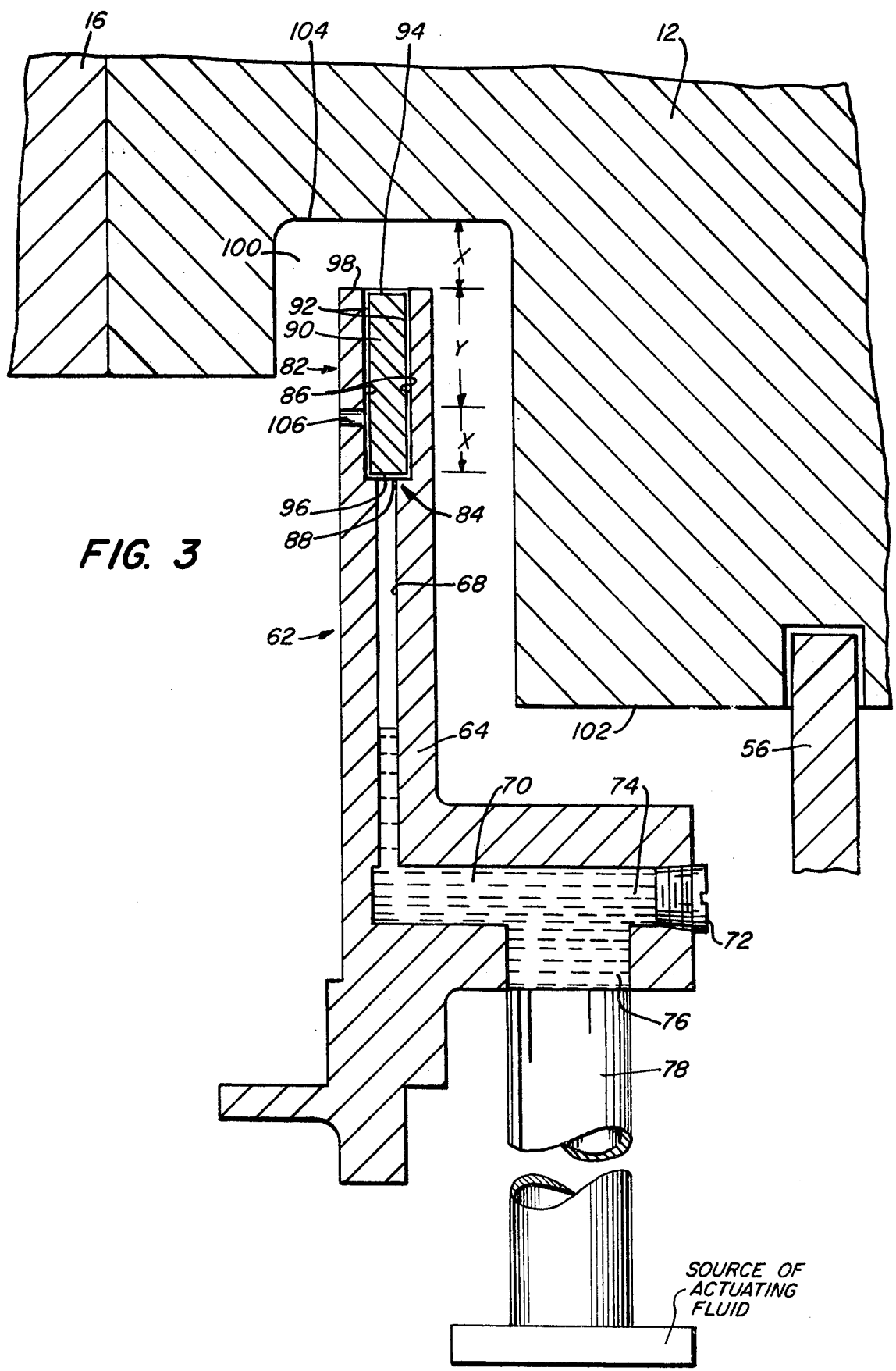
FIG. 3 is a similar view of the sealing arrangement as FIG. 2, with the sealing arrangement in another mode of operation.

As may be evidenced from a comparison between FIGS. 2 and 3, sealing ring 90 is movable within the slot 84 in a direction which is substantially parallel to the axis of rotation of the bull gear 14 (see FIG. 1). It is for this reason that the side walls of both the slot 84 and the sealing ring 90 are formed parallel to each other. When situated fully within the slot 84, the sealing ring 90 rests upon the sealing seat 88 formed at the bottom of the slot and has its top portion 94 substantially flush with the top 98 of the housing 64 (see FIG. 2).

The sealing arrangement 62 is oriented relative to the roller 12 such that the sealing ring 94 may be moved into sealing association with a cut away portion 100 formed within a side 102 of the roller 12. This configuration is best seen in FIGS. 2 and 3. The cut away portion 100 within roller 12, at least in the preferred embodiment, is configured such that a sealing surface 104, formed at the bottom of the cut-out, is oriented normal to the direction of movement of the sealing ring 90 within the slot and to the axis of rotation of the roller 12. It should be noted that maximum sealing effectiveness is accomplished when the loading force upon the sealing ring (the direction of its movement) is substantially normal to the surface to be sealed. This rather general statement has some latitude as will be evidence below. However, it is true that best sealing is accomplished when the components just discussed are in the orientation noted above.

The housing 64 of the arrangement 62 is positioned relative to the surface to be sealed, i.e., surface 104, such that the sealing ring must be moved a distance "X" out of the slot to sealingly engage the surface. This distance "X", it will be noted, must be less than the amount "Y" of the sealing ring remaining within the slot after the sealing ring has been actuated into sealing association with surface 104. Applicants have determined that risk of seal blow-out and sealing efficiency loss are minimized when "Y" is equal to approximately twice "X". The distance "X" of movement of the sealing ring within the slot toward the surface 104 is important for one additional reason. Specifically, there is a small bleed hole 106 located within the housing 64 just below the operative position of the bottom 96 of the sealing ring (see FIG. 2). The bleed hole 106, a plurality of which are scattered about the circumference of the housing, extends from the inside of the slot 84 to the exterior of the housing 64 in the manner shown in FIGS. 2 and 3. The bleed hole 106 insures a "controlled leak" from the source of grease to the inside of the roller/bull gear assembly. This leak is purposefully done for insuring a constant influx of grease to the area proximate the sealing ring and slot. This becomes important when it is realized that the roller/bull gear assembly, as well as the sealing arrangement to a certain degree, are subjected to heat and dirt conditions which might cause the grease within the arrangement to dry out or "freeze" within the bores. Should this happen, the sealing arrangement might fail and cause the premature failure of the bearing and/or roller.

The grease which actuates the sealing arrangement of the present invention is applied to the sealing ring/slot area under a pressure which is preferably within the range of 30-50 p.s.i. The amount of grease which "leaks" out of the bleed hole 106 is approximately 1½ cubic in. a day, an amount insufficient to waste grease, but of sufficient size to insure the constant influx of new grease. No grease, in anything but infinitesimal amounts, is released from the arrangement from between the sealing ring and slot walls. The grease which is employed within the present sealing arrangement is operative to move the sealing ring from a "non-actuated position", as shown in FIG. 3, to an "actuated" sealing position, as shown in FIG. 2, without the substantial leaking of grease between the seal and its slot. In order to increase the sealing efficiency between the sealing ring and the slot walls, the sealing ring may be configured to provide an increased sealing force in this vicinity of the seal.

FIG. 4 is an enlarged view of the sealing ring 90 proximate the sealing seat 88 of the slot 84 with two different lower end embodiments. In the embodiment shown, the grease 108 has been pressurized and has actuated or moved the sealing ring upwardly away from the sealing seat 88. The lower end of the sealing ring, in one embodiment, has been shaped and includes a groove 110 therein. Due to the inclination of the groove, in its generally concave configuration, there is a horizontal vector component derived from the pressurized grease upon the inclinations. As such, there is an outwardly directed component of the upwardly and outwardly grease force (as indicated by arrows 112) which force the outer edges 114 into deeper sealing association with the side walls 86 of the slot 84. By the same token the second embodiment, shown in phantom, has a concave configuration and achieves the same end result, i.e., the outward movement of the seal edges into more efficient sealing association with the slot. The concave circular cut-out 116 may take any one of a number of specific configurations without losing this desired effect.

Looking to FIG. 5, there is shown the adaptation of the concave seal with respect to the upper as well as lower portion of the sealing ring. For instance, the lower portion 96 of the sealing ring 90 includes the groove 110. Additionally, the upper portion 94 of the sealing ring is similarly configured for the creation of a better seal between surface 104 and the top of the seal. The manner in which the concave cut-out achieves this increased sealing efficiency may be evidenced from the phantomed "pressurized" position of the seal when in sealing association with the surface 104.

It has been stated previously that the seal configuration most likely to achieve the most efficient seal is one in which the loading force (and movement) of the seal is substantially perpendicular to the surface being sealed. While this may be true in a majority of situations, there may be others in which sealing efficiency may not be of sole concern and some degree of compromise may be achieved. For instance, FIG. 6 is a diagrammatical representation of a variety of sealing surface orientations with respect to the axis of rotation 40. A series of three different surfaces 118, 120 and 122 are represented with the Figure. Surfaces 118 and 122 are oriented at angles "A" and "B", respectively, with respect to the axis of rotation. Surface 120 is oriented normal to the axis 40. Applicants have determined that meaningful sealing engagement between the sealing ring (represented by arrows 124, 126 and 128) may be realized when there is any angularity of the surface to be sealed and the axis of rotation, i.e., "A" and "B" are not each equal to zero degrees. However, for practical purposes, the angles "A" and "B", representing the angular orientation of surfaces 118 and 122 with respect to the axis of rotation, should be at least 45 degrees. Accordingly, effectively sealing association between the sealing element or ring may be had within any surface angularity within the quadrant defined between surface 118 and surface 122 (denoted as angle C = 90°). While the only embodiment specifically considered has included the normal orientation of the seal with the surface, it should be noted that the top of the sealing ring may or may not conform in its angularity with the angularity of the surface to be sealed. For instance, the seal associated with a surface 118 may have its top surface oriented in a direction parallel with surface 118. It is apparent that such complementary configuring of the seal top with the angularity oriented surface to be sealed would have a marked effect upon the increase in that embodiment's sealing capacity.

The sealing arrangement according to the present invention includes a variety of advantages over the old sealing systems. While the embodiments just discussed may either directly or indirectly refer to the use of grease as the actuating fluid, such limitations are not meant to apply for all cases. For example, oil or a graphite sludge may be easily substituted for the aforementioned grease lubricant. Additionally, Teflon ® (poly(tetrofluoroethylene)) sealing rings may be exchanged for rings manufactured from a relatively soft metal such as brass or the like. It is also assumed that the sealing arrangement may be linear in configuration rather than circular as has been described. For the most part, all of these variations, as well as the preferred embodiment discussed, work on the same principle and achieve the same advantages. Some of these advantages will now be described.

Possibly the major consideration to be given the present sealing arrangement over the other systems in common use, other than sealing efficiency per se, is its capacity of accommodating movement of the sealing surface both toward and away from the arrangement. Due to the pressurization of the actuating fluid, there is a shock-absorber quality realized from the present arrangement. Minor movement of the sealing surface 104 away from the sealing housing will be "picked-up" by the movement of the sealing ring further out of its slot. Similarly, movement of the surface 104 toward the housing will correspondingly move the sealing ring deeper into its slot. For practical purposes, this movement may be uneven from side to side, thereby creating a wobble of the sealing surface relative to the seal housing. Within reasonable limits, the present sealing arrangement is capable of accommodating even this type of rotation irregularity. In this regard, reference should now be made to FIG. 7, in which an exaggerated wobble has been diagrammatically illustrated.

The slot shown in FIG. 7, as well as that discussed in the preferred embodiment, has a width equal to 0.300 inches. Similarly, the sealing ring 90 is configured having a width of 0.250 inches, thereby leaving maximum clearance on each side of the seal of 0.025 inches. It should also be noted that this distance may easily be decreased without materially affecting the operation to be described. As may be seen by referring to FIG. 7, the dimensional difference between the slot width "S" and the sealing ring width "R" permits for a slight angular displacement of the sealing ring from its "normal" position in which it is in a parallel orientation with the slot side walls 86. This amount of angular movement is shown as angle "P" with the Figure and represents the sum of two angles ½ P as measured from the "vertical" which is parallel to the slot sides 86. These angles as well as the two positions of the ring 90, have been purposefully exaggerated for more clearly indicating the sealing ring movement permitted by the arrangement. It should become apparent that if it is assumed that the sealing ring is in its phantomed position (as seen in FIG. 7) and FIG. 7 represents the right hand side of the sealing arrangement of FIG. 1, then the distance "D" on the right side of the sealing ring will be greater than the distance the sealing ring extends out of the slot on the left hand side (see FIG. 1). It is this dimensional difference of the present arrangement which accommodates both any minor wobble of the sealing surface 104 relative to the housing as well as any minor misalignment of the shaft or bull gear 14 relative to the housing 64.

Possibly one of the more important aspects of the present invention has not yet been discussed; the provision, within the present sealing arrangement, for the sealing ring 90 to rotate within the slot 84 or not. In the preferred embodiment of the sealing arrangement the sealing ring 90 is configured to rotate within the slot 84 along with the surface 104 being sealed. It should become apparent that the grease or actuating fluid also serves to lubricate the sealing ring 90 within the slot 84 as the former rotates with the roller surface 104. Configured as such, there is minimized wear upon the sealing ring and a better ring to roller surface seal realized. Should it be desirable to retain the sealing ring within the slot without relative rotation, the sealing ring 90 may be configured to provide for relative movement between the seal and the roller surface 104. While this embodiment is not indicated within the drawings, it should become apparent that a variety of different sealing ring/slot arrangements could be applicable for restraining movement of the former relative to the latter. For instance, the sealing ring could be easily fabricated having vertically disposed fins or the like which fit within complementary configured slots formed in the housing 64. In this manner the ring 90 would remain rotationally static with respect to the slot. However, applicants have determined, at least in the preferred embodiment, that it is more desirable for the ring and sealing surface to rotate with each other.

It should be seen that the present fluid actuated sealing arrangement, whether applied in conjunction within a rotating or non-rotating situation, provides a simplified, inexpensive, efficient and easily maintained substitute for the complicated and unreliable sealing systems currently employed. The arrangement advantageously provides for an improved seal in which the actuating fluid is a lubricant which both actuates the seal as well as lubricates the sealing element within the arrangement. As such, a sealing arrangement is provided with is effective to accommodate both misalignment of the seal and element to be sealed as well as minor amounts of wobble and movement of one element relative to the other. However, the primary advantages of any sealing system, of which the present is a good example, is the efficiency with which it operates. In the present case, this advantage is certainly fulfilled.

Accordingly, while certain changes may be made in the above-noted apparatus without departing from the scope of the invention herein involved, it is intended that all matter contained in the above description or shown in the accompanying drawings shall be interpreted as illustrative and not in a limiting sense.

We claim:

1. A fluid actuated sealing arrangement adapted to provide a seal for an element to be sealed, said fluid actuated sealing arrangement comprising:

a housing, said housing having a means defining a bore extending therethrough through which an actuating fluid, from a source, may be passed from an entrance end of said housing to a sealing end of said housing and means defining a slot at said sealing end of said housing connected to said bore and being configured having a sealing seat therein; and a seal element, adapted to fit within said slot, said seal element being movable by such actuating fluid away from said sealing seat into sealing association with such element to be sealed, a portion of said seal element being extendable from without the confines of said slot thereby leaving a fluid fillable volume between the bottom of said seal element and said sealing seat for accommodating movement of said element to be sealed toward and away from said sealing seat, such fluid being operative to both actuate said seal element and lubricate said seal element within said slot of said housing.

2. The fluid actuated sealing arrangement according to claim 1 wherein said housing is further configured having means defining at least one bleed hole extending between said slot and the exterior of said housing for permitting a relatively small portion of such actuating fluid to escape from said slot and insure the constant ingress thereto of a fresh supply of such actuating fluid from such source.

3. The fluid actuated sealing arrangement according to claim 1 wherein said seal element is configured having a portion removed from the lower portion thereof which is in closest proximity to said sealing seat to form a generally concave configured lower portion for increasing the sealing efficiency of said seal element with respect to said slot, the outer edges of the lower portion of said seal element being forced by such actuating fluid into deeper sealing association with said slot.

4. The fluid actuated sealing arrangement according to claim 1 wherein said slot is configured having substantially parallel sides and a bottom configured as said sealing seat oriented substantially normal thereto, said seal element having substantially parallel sides and a width slightly smaller than the width of said slot.

5. The fluid actuated sealing arrangement according to claim 1 wherein said housing, said slot and said seal element are configured and positioned relative to the element to be sealed such that the amount of said portion of said seal element which extends beyond the confines of said slot to sealingly engage the element to be sealed is less than the amount of said seal element remaining within the confines of said slot.

6. A fluid actuated self-orienting sealing arrangement for a rotatable member having a sealing surface formed as a portion thereof which is in a substantially non-parallel orientation to the member's axis of rotation, said fluid actuated self-orienting sealing arrangement comprising:

a housing, said housing having a generally hollow centered cylindrical configuration with a top portion in relatively close proximity to such sealing surface, said housing being configured to receive at least a portion of said rotatable member therethrough, said housing having means defining at least one bore extending through at least a portion of said housing to said top portion, said bore being located within said cylindrically shaped housing for permitting passage of actuating fluid from a source through said housing to said top portion proximate such sealing surface, said housing being further configured having means defining a generally circular parallel-walled slot formed within the top portion of said housing substantially concentric with the center of said housing and being connected to said bore such that said slot may receive such actuating fluid therefrom, said slot having a sealing seat formed at the bottom thereof; and a sealing ring, adapted to fit within and substantially fill said slot formed in said top portion of said cylindrical housing, said sealing ring being movable by such actuating fluid away from said sealing seat and into sealing association with such sealing surface, said sealing ring having a portion which is extendable out from said slot above the plane of said top portion of said housing in a direction substantially parallel to the axis of rotation of such rotatable member, thereby leaving a fluid fillable volume between the bottom of said sealing ring and said sealing seat which is operative, when filled with such fluid, to accommodate movement of said sealing ring due to movement of such sealing surface both toward and away from said sealing arrangement during rotation of the rotatable member and the operation of the sealing arrangement, said sealing ring being operative to self-orient itself within said slot to accommodate any minor misalignment of said housing relative to such sealing surface, such actuating fluid being operative to both actuate said sealing ring into sealing association with such sealing surface and lubricate said sealing ring within said slot formed in said housing.

7. The fluid actuated self-orienting sealing arrangement according to claim 6 wherein said sealing ring is cylindrical in shape having top and bottom substantially planar ends, said sealing ring being operative to provide the most efficient seal to such sealing surface of such rotatable member when such sealing surface is oriented between the angles of 45 degrees and 90 degrees with respect to the axis of rotation of such rotatable member.

8. The fluid actuated self-orienting sealing arrangement according to claim 6 wherein said sealing ring is cylindrical in shape having top and bottom substantially planar ends, said sealing ring being operative to provide the optimumally efficient seal to such sealing surface of such rotatable member when such sealing surface is oriented normally with respect to the axis of rotation of such rotatable member.

9. The fluid actuated self-orienting sealing arrangement according to claim 6 wherein said sealing ring is configured having a portion removed from the lower portion thereof which is in closest proximity to said sealing seat to form a generally concave cross-sectional configuration to the lower portion thereof, the outer edges of the lower portion of said sealing ring being forced by such actuating fluid into deeper sealing association with said slot, thereby increasing the sealing efficiency of said sealing ring with respect to said cut away portion.

10. The fluid actuated self-orienting sealing arrangement according to claim 6 in which said sealing seat is oriented substantially normal to said sides of said slot, said sealing ring having substantially parallel sides and a thickness, at any point around its circumference, slightly smaller than the width of said slot.

11. The fluid actuated self-orienting sealing arrangement according to claim 6 wherein said housing, said slot and said sealing ring are configured and positioned relative to the element to be sealed such that the amount of said sealing ring extendable out of said slot above the plane of said top portion to engage such sealing surface is less than the amount of said sealing ring remaining within the confines of said slot.

12. The fluid actuated self-orienting sealing arrangement according to claim 6 in which said slot and said sealing ring are configured such that said sealing ring is rotated along with said rotatable member and associated sealing surface within said slot, such actuating fluid providing the necessary lubrication to said sealing ring and slot to permit such operation.

13. The fluid actuated self-orienting sealing arrangement according to claim 6 wherein said sealing ring is configured having a generally cylindrical shape, said ring having a portion removed from both the top and bottom planar portions thereof to form concave cross-sectional configurations to both planar portions, the outer edges of said concave portions of said top and bottom portions being forced by such actuating fluid into deeper sealing association with such sealing surface and said slot, respectively, thereby increasing the sealing efficiency of said sealing ring relative to said sealing surface and said slot, respectively, such sealing surface being orientated substantially normal to the axis of rotation of such rotatable member.

14. The fluid actuated self-orienting sealing arrangement according to claim 6 wherein said sealing ring is formed from poly(tetrofluoroethylene).

15. The fluid actuated self-orienting sealing arrangement according to claim 6 wherein said sealing ring is formed from any relatively soft metal.

16. The fluid actuated self-orienting sealing arrangement according to claim 6 in which said housing further includes means defining at least two bleed holes extending from said slot to the exterior of said cylindrical housing in a periodically spaced relationship about said cylindrical housing, said bleed holes being operative to insure the continuous flow of such actuating fluid to the area proximate said slot and said sealing ring.

17. The fluid actuated self-orienting sealing arrangement according to claim 16 wherein said bleed holes are located in said housing between said sealing seat and the bottom of said sealing ring at said fluid filled volume during the proper operative orientation of said sealing arrangement.

18. A liquid lubricant actuated sealing arrangement for a roller which is mounted for rotation with a shaft, both such roller and such shaft having substantially identical axes of rotation, such roller having rolling surface oriented substantially parallel to such axes of rotation and having at least one side oriented substantially normal to the axes of rotation, said sealing arrangement comprising:

a housing, said housing having a generally cylindrical configuration for surrounding such shaft and a top portion which is in relatively close proximity to one side of such roller which is to be sealed, said housing having means defining bores extending through at least a portion of said housing from an entrance to said top portion of said housing, said bores permitting passage of actuating liquid lubricant therethrough from a source of such liquid connected to the entrance portion of said bore to said top portion, said housing being configured having a generally circular slot formed within said top portion and concentric with said axes of rotation, said slot being connected to said bores such that such actuating liquid may egress from said housing through said slot, said slot being configured having a seal seat formed at the bottom thereof; and a sealing ring, said sealing ring being adapted to fit and substantially fill said slot in said top portion of said housing and to rotate within said slot with such roller, being of a size relative to said sealing ring said slot such that it is movable by such actuating liquid into sealing association with such one side of such roller to be sealed, said sealing ring having an upper portion thereof which is extendable out of said slot above the plane of said top portion of said housing, thereby leaving a fluid fillable volume between the bottom of said sealing ring and said sealing seat which is operative, when filled with such liquid lubricant, to accommodate any minor wobble of said roller relative to said housing due to wear of such roller or shaft and to accommodate any minor misalignment of said housing relative to such roller side, such actuating liquid lubricant being operative to both actuably move said sealing ring into sealing association with said normally oriented roller side and to lubricate said sealing ring for its rotational movement within said slot, said sealing ring preventing the ingress of contaminates to such shaft from between said housing and such roller side and providing an efficient and non-wearing seal between said housing and such roller.

19. The liquid lubricant actuated sealing arrangement according to claim 18 wherein said sealing ring is configured having a portion removed from the lower portion thereof which is in closest proximity to said sealing seat to form a generally concave cross-sectional configuration to the lower portion thereof, the outer edges of the lower portion of said sealing ring being forced by such actuating liquid into deeper sealing association with said slot, thereby increasing the sealing efficiency of said sealing ring with respect to said cut away portion.

20. The liquid lubricant actuated sealing arrangement according to claim 18 wherein said housing, said slot and said sealing ring are configured and positioned relative to such roller to be sealed such that the amount of said sealing ring extendable out of said slot above the plane of said top portion to engage such roller side is less than the amount of said sealing ring remaining within the confines of said slot.

21. The liquid lubricant actuated sealing arrangement according to claim 18 wherein said sealing ring is formed from poly(tetrofluoroethylene).

22. The liquid lubricant actuated sealing arrangement according to claim 18 wherein said sealing ring is formed from any relatively soft metal.

23. The liquid lubricant actuated sealing arrangement according to claim 18 in which said housing further includes means defining at least two bleed holes extending from said slot to the exterior of said cylindrical housing in a periodically spaced relationship about the said cylindrical housing, said two periodically spaced bleed holes being operative to insure the continuous flow of such actuating liquid lubricant to the area proximate said slot and said sealing ring.

24. The liquid lubricant actuated sealing arrangement according to claim 23 wherein said bleed holes are located in said housing between said sealing seat and the bottom of said sealing ring at said fluid filled volume during the proper operative orientation of said sealing arrangement.

* * * * *